United States Patent
McDaniel et al.

(10) Patent No.: US 9,254,453 B2
(45) Date of Patent: Feb. 9, 2016

(54) ECONOMICAL METHOD FOR SCAVENGING HYDROGEN SULFIDE IN FLUIDS

(71) Applicant: Halliburton Energy Services, Inc., Houston, TX (US)

(72) Inventors: Cato Russell McDaniel, The Woodlands, TX (US); Carl J. Thaemlitz, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 304 days.

(21) Appl. No.: 13/787,759

(22) Filed: Mar. 6, 2013

(65) Prior Publication Data
US 2014/0251922 A1    Sep. 11, 2014

(51) Int. Cl.
| | |
|---|---|
| C02F 1/52 | (2006.01) |
| C02F 1/68 | (2006.01) |
| B01D 21/01 | (2006.01) |
| B01D 53/14 | (2006.01) |
| B03D 3/00 | (2006.01) |
| E21B 21/06 | (2006.01) |
| B01D 19/00 | (2006.01) |
| B01D 53/52 | (2006.01) |
| C02F 1/56 | (2006.01) |
| E21B 21/01 | (2006.01) |

(52) U.S. Cl.
CPC ........ B01D 19/0005 (2013.01); B01D 53/1493 (2013.01); B01D 53/52 (2013.01); C02F 1/52 (2013.01); C02F 1/56 (2013.01); E21B 21/01 (2013.01)

(58) Field of Classification Search
CPC ............... B01D 19/0005; B01D 53/52; B01D 53/1468; B01D 53/1493; B01D 2257/304; C01B 17/05; C02F 1/52; C02F 1/56; C02F 1/66; C02F 1/72; E21B 21/01; E21B 21/06; E21B 21/063; E21B 21/067; E21B 21/068
USPC ......... 210/702, 718, 723, 725, 727, 729, 730, 210/749, 750, 758; 423/220, 226, 230; 175/66, 206, 207
See application file for complete search history.

(56) References Cited

U.S. PATENT DOCUMENTS

| | | |
|---|---|---|
| 1,771,136 A | 7/1930 | Murphy |
| 2,003,701 A | 6/1935 | Stinson |
| 2,276,075 A | 3/1942 | Wuensch |
| 2,298,984 A | 10/1942 | Stinson |
| 2,529,178 A | 11/1950 | Nieland et al. |
| 2,941,783 A | 6/1960 | Stinson |
| 3,226,320 A | 12/1965 | Meuly et al. |
| 3,301,323 A | 1/1967 | Parsons |
| 3,307,625 A | 3/1967 | Johnson et al. |
| 3,576,221 A | 4/1971 | Hasiba |
| 3,618,667 A | 11/1971 | Snavely |
| 3,713,499 A | 1/1973 | Arscott et al. |
| 3,928,211 A | 12/1975 | Browning et al. |
| 3,933,993 A | 1/1976 | Salemme |
| 4,008,775 A | 2/1977 | Fox |
| 4,076,621 A | 2/1978 | Hardison |
| 4,091,074 A | 5/1978 | Gorai et al. |
| 4,147,212 A | 4/1979 | Tisdale |
| 4,246,243 A | 1/1981 | Fox |
| 4,252,655 A | 2/1981 | Carney |
| 4,324,298 A | 4/1982 | Fox |
| 4,451,442 A | 5/1984 | Jeffrey et al. |
| 4,473,115 A | 9/1984 | Oakes |
| 4,526,693 A | 7/1985 | Son et al. |
| 4,539,122 A | 9/1985 | Son et al. |
| 4,633,949 A | 1/1987 | Crowe |
| 4,756,836 A | 7/1988 | Jeffrey et al. |
| 5,188,179 A | 2/1993 | Gay et al. |
| 5,314,750 A | 5/1994 | Takedoi et al. |
| 5,472,633 A | 12/1995 | Griffin, Jr. et al. |
| 5,749,418 A | 5/1998 | Mehta et al. |
| 6,365,053 B1 | 4/2002 | Sunde et al. |
| 6,746,611 B2* | 6/2004 | Davidson ............... 210/725 |
| 7,476,324 B2* | 1/2009 | Ciampi et al. ............ 210/758 |
| 7,846,408 B1* | 12/2010 | Cox, Jr. .................. 423/244.01 |
| 2004/0167037 A1 | 8/2004 | Davidson |
| 2005/0209322 A1 | 9/2005 | Rangisetty et al. |

(Continued)

FOREIGN PATENT DOCUMENTS

| | | |
|---|---|---|
| EP | 0153192 A2 | 8/1985 |
| EP | 0153192 A3 | 8/1985 |

(Continued)

OTHER PUBLICATIONS

International Application Serial No. PCT/US2014/032540, International Search Report mailed Aug. 19, 2014, 3 pgs.
International Application Serial No. PCT/US2014/032540, Written Opinion mailed Aug. 19, 2014, 4 pgs.
Amosa, M. K. et al., "Corrosion inhibition of oil-well steel (N-80) in simulated hydrogen sulphide environment by ferrous gluconate and synthetic magnetite", *NAFTA*, vol. 5, (2010), 239-246.
Halliburton, Sourscav®, Product Data Sheet, Aug. 31, 2010, one page, Halliburton.
Eric Davidson, John Hall, Colin Temple, An Environmentally Friendly, Highly Effective Hydrogen Sulfide Scavenger for Drilling Fluids, Presentation, Oct. 2003, eight pages, SPE 84313, Society of Petroleum Engineers, Denver, Colorado, United States.

(Continued)

*Primary Examiner* — Nam Nguyen
*Assistant Examiner* — Nader Hossaini
(74) *Attorney, Agent, or Firm* — Schwegman Lundberg & Woessner, P.A; Holly Soehnge

(57) ABSTRACT

Method for removing hydrogen sulfide from fluids such as oil and gas well drilling, treatment, and production fluids and effluents from hydrocarbon operations and mineral mining operations. The sulfide scavenger used in the method is a gluconate salt other than ferrous gluconate. The gluconate salt is added to the fluid along with an iron source if iron is not already in the fluid. The gluconate reacts with the iron and forms iron gluconate in the fluid, which in turn reacts with the hydrogen sulfate to form iron sulfide which may be readily removed from the fluid.

20 Claims, No Drawings

(56) References Cited

U.S. PATENT DOCUMENTS

2010/0304418 A1* 12/2010 Moussavi et al. ............... 435/28
2011/0269220 A1* 11/2011 Van Slyke .................... 210/601

FOREIGN PATENT DOCUMENTS

GB      1588566       4/1981
WO   WO-2014138750 A1   9/2014

OTHER PUBLICATIONS

Eric Davidson, John Hall, Colin Temple, A New Iron-Based, Environmentally Friendly Hydrogen Sulfide Scavenger for Drilling Fluids, Article, Dec. 2004, six pages, SPE Drilling & Completion, Society of Petroleum Engineers, United States.

Mario A. Ramirez, Efrain Casadiego, Mary Spates, Almaz Thekkabylov, A New Method to Measure the Excess of H2S Scavenger in the Karachaganak Field, Presentation, Nov. 2010, thirteen pages, SPE 140018, Society of Petroleum Engineers, Atyrau Kazakhstan.

* cited by examiner

ECONOMICAL METHOD FOR SCAVENGING HYDROGEN SULFIDE IN FLUIDS

BACKGROUND OF THE INVENTION

1. Field of the Invention

This invention relates to methods and compositions for removal or inactivation of hydrogen sulfide or soluble sulfide ions from various fluids used in various hydrocarbon recovery or mineral mining operations in subterranean formations. The invention is also applicable to removal of hydrogen sulfide or soluble sulfide ions from other fluids such as fluids produced in such operations from a subterranean formation, and to other fluids that contain hydrogen sulfide such as fluids in sewage systems. The advantages of the invention are particularly appreciated with high pH fluids.

2. Description of Relevant Art

Hydrogen sulfide in fluids is well known to be corrosive to pipes and other containers of the fluids and to many other surfaces in contact with the fluids. Hydrogen sulfide is also a known environmental pollutant and a health risk to persons exposed to it. Low concentrations of hydrogen sulfide irritate conjunctiva and mucous membranes and cause headaches, dizziness, nausea and lassitude. Exposure to high concentrations can result in death.

In drilling some subterranean formations, and often particularly those bearing oil or gas, hydrogen sulfide accumulations are frequently encountered. The drilling fluid or mud brings the hydrogen sulfide to the surface. Such sulfide in the drilling fluid is problematic for the reasons noted above. Generally, to protect the health of those working with the drilling fluid and those at the surface of the well, conditions are maintained to ensure that the concentration of hydrogen sulfide above the fluid, emitted due to the partial pressure of the gas, is less than about 15 ppm. The partial pressure of hydrogen sulfide at ambient temperature is a function of the concentration of sulfide ions in the fluid and the pH of the fluid. To ensure that the limit of 15 ppm is not exceeded even for the maximum sulfide concentration that may be encountered in a subterranean formation, the pH of the drilling fluid is typically maintained at a minimum of about 11.5. Also, to prevent the soluble sulfide concentration in the fluid from becoming excessive, action is routinely taken to remove sulfide from the fluid.

Various methods, techniques and compositions have been used for removing hydrogen sulfide from such fluids. U.S. Pat. No. 4,008,775, issued Feb. 22, 1977, to Fox, teaches a method of scavenging hydrogen sulfide from drilling mud using porous iron oxide particles having a composition of substantially $Fe_3O_4$ and having a surface area at least ten times that of magnetite particles of equal size, the greater part of which are no longer than 60 microns.

U.S. Pat. No. 4,756,836, issued Jul. 12, 1988, to Jeffrey et al. teaches decreasing hydrogen sulfide entrained in a drilling mud by adding iron chelate to the mud at the wellhead and circulating the mud in the well being drilling with the mud, allowing the hydrogen sulfide in the mud to be exposed to the iron chelate for conversion of the hydrogen sulfide into elemental sulfur. The chelating agents taught are ethylenediaminetetraacetic acid (EDTA), hydroxethylethylenediaminetriacetic acid (HEDTA), nitrilotriacetic acid (NTA), and diethylenetriaminepentaacetic acid (DTPA). Claimed advantages of this invention are said to be that the iron chelate is regenerated by oxygen at the surface and that the iron scavenges oxygen in the mud stream to cut down oxygen assisted corrosion of the drill stem.

This patent to Jeffrey et al. further teaches that whether the iron is supplied in the Fe (II) or Fe (III) form, exposure to oxygen at some point in the mud flow changes the form to Fe (III) to prepare the chelate for hydrogen sulfide conversion. Oxygen exposure in an aerated mud pit or in the shale shaker or by another oxygen source is said to aid regeneration of the iron chelate. While iron (III) is known to readily chelate with EDTA, NTA and HEDTA and DTPA, such complexes have limited stability at high pH. Iron in these complexes is well known to tend to precipitate out as ferric hydroxide at a pH greater than 9. For example, manufacturers of these chelates typically quote stability or effectiveness as an Fe (III) chelate, of NTA at pH 1-3, DPTA at pH 1-7, EDTA at pH 1-6, and HEDTA at pH 1-9. At pH higher than such ranges, these chelating agents lack ability to stabilize the iron against precipitation as the hydroxide. For effective use as a scavenger according to the teachings of Jeffrey invention of U.S. Pat. No. 4,756,836, the iron must stay in chelated form. Further, the multivalent nature of iron III is likely to cause crosslinking of polymers in a polymer based drilling mud, leading to gelation and interference with the rheology of the fluid.

U.S. Pat. No. 6,365,053 B1, issued Apr. 2, 2002 to Sunde, et al. teaches a method of removing hydrogen sulfide from drilling mud using a relatively sparingly soluble divalent environmentally acceptable iron salt in the drilling mud. The preferred such divalent iron salt taught is iron oxalate. The hydrogen sulfide in the mud is said to react with the iron salt to form iron sulfide.

U.S. Pat. No. 6,746,611 B2, issued Jun. 8, 2004 to Davidson, teaches an environmentally friendly method of removing hydrogen sulfide or hydrogen sulfide ions from fluids having a pH in excess of about 9 and as high as a pH of 12 or higher using iron chelating agents having stability at such high pH. The preferred chelating agents taught are ferrous gluconates which are added to the fluid in sufficient quantities to form iron sulfide with the sulfide ion. The iron chelating agent is mixed with the fluid and an iron sulfide is formed.

Using ferrous gluconate to remove hydrogen sulfide from drilling fluids as taught by Davidson has become well known and accepted, as ferrous gluconate is an effective sulfide scavenger that does not impair the properties of the drilling fluid to which it is added. Ferrous gluconate is also fully biodegradable and, as a common dietary supplement, is not considered environmentally incompatible.

Ferrous gluconate is relatively expensive, however, and thus there is a continuing need for environmentally compatible alternatives.

SUMMARY OF THE INVENTION

The present invention provides an economical alternative to adding ferrous gluconate to fluid containing hydrogen sulfide for removal of the hydrogen sulfide, that has the advantages of that method but at a lower cost. The method of the invention comprises adding a gluconate additive to the fluid, and if the fluid does not already contain iron ions or a source of iron, also adding a source of iron to the fluid, both to be in sufficient quantity that they react together, that is, the gluconate reacts with the iron to form iron gluconate in the fluid. In turn, the iron gluconate will react with the hydrogen sulfide in the fluid, forming iron sulfide, water and gluconic acid, providing the advantages as if iron gluconate had been directly added to the fluid, but without the cost of iron gluconate. Also, the gluconic acid formed in the fluid will further react with the iron in the fluid to form more iron gluconate, which is then available for reaction with hydrogen sulfide for creating more iron sulfide and removing more hydrogen sulfide from the fluid In this manner the gluconate acts in a catalytic manner, participating in the reaction but reformed at the end of reaction to allow more ferrous gluconate to be formed. The overall effect is that an inexpensive source of iron such as the oxide is made into ferrous gluconate in situ and the benefits are obtained without the cost.

DETAILED DESCRIPTION OF PREFERRED EMBODIMENTS OF THE INVENTION

The present invention provides a cost effective method for rapid and complete removal of hydrogen sulfide from fluids such as, for example: wellbore construction and treating fluids; sour waters and other fluids produced from oil and gas wells, including hydrocarbons such as crude, bitumen and asphalt, as well as brines and other oilfield effluents; surface treatment fluids associated with wellbore construction and treatments; non-oilfield effluents from mining operations and non-oilfield industrial drilling or boring and other construction operations; and tank fluids from tanks, vessels, and other containers of produced waters, oil, gas, tars, and other petroleum hydrocarbons and treatments from such containers. The method is particularly suitable for scavenging hydrogen sulfide in high pH fluids such as drilling fluids used in drilling wells in hydrocarbon-bearing subterranean formations, but is not limited to such an application.

The method of the invention employs a gluconate additive comprising an organic compound from a group capable of acting as a chelating agent with iron. The iron chelate compounds or complexes are stable at high pH and preferably do not form gels in polymer based fluids, making the complexes or compounds excellent sulfide scavengers for use in drilling fluids, for example. Particularly, gluconic acid has been found to form stable complexes with iron (II) at pH above 9 and even at pH ranging from about 11 to 12 or higher, the pH most commonly desired for drilling fluids that are in contact with soluble sulfide or hydrogen sulfide.

In the method of this invention, the gluconate additive (other than ferrous gluconate) is added to a fluid, such as a drilling fluid or mud, containing hydrogen sulfide. When the fluid is a drilling fluid, this gluconate additive may typically be added to the fluid in the mud pit, before the fluid has circulated in a subterranean well, or before the fluid contains any detectable amount of sulfur or hydrogen sulfide, as a prophylactic measure against any hydrogen sulfide the fluid may encounter downhole. However, alternatively or additionally, the additive may be added after the fluid has been circulating downhole and has already encountered sulfur or hydrogen sulfide and contains same. The additive may also be added to fluids in tanks that contain hydrogen sulfide to be removed.

For the method of the invention, the fluid must also contain iron or a source of iron or iron ions. Such iron may already be in the fluid or may be added to the fluid at the same time or before or after the gluconate additive of the invention. According to the method of the invention, the gluconate additive and the iron or iron ions will react so that iron gluconate is formed in situ. In turn, this iron gluconate will react with the hydrogen sulfide in the fluid, forming iron sulfide, water, and gluconic acid. The gluconic acid will react with the iron to form more iron gluconate, which will also be available to react with any remaining hydrogen sulfide to form iron sulfide.

The quantity of iron desired in the fluid should be sufficient to react with or chelate with the gluconate additive to form iron gluconate in the fluid in a quantity sufficient to react with the hydrogen sulfide in the fluid in the amount to remove the desired amount of hydrogen sulfide from the fluid. That is, the quantity of gluconate additive to be added will generally depend on the quantity of hydrogen sulfide desired to be removed or scavenged. Generally, one mole of ferrous gluconate will remove one mole of hydrogen sulfide. Stronger chelation of the iron may result when an excess of the gluconate is present in the fluid for the amount of hydrogen sulfide in the fluid.

The gluconate additive may be added in solid or liquid form. If in liquid form, the preferred carrier fluid is aqueous. Any other components of the additive should not be of the type that can interfere with the chelating action of the gluconate with the iron or with the stability of the complex. Further, any such other components should preferably not be of a type to cause crosslinking of any polymers that may be in the fluid, particularly if the fluid is polymer based. Iron (II) or ferrous gluconate is commonly used as an iron supplement for dietary purposes and thus is considered non-toxic. Further, the gluconic moiety is derived from glucose and thus iron (II) gluconate is also fully biodegradable. Heptagluconate may be substituted for gluconate in the compounds or complexes of this invention and the term "gluconate" as used herein shall be understood to encompass "heptagluconate" as well.

The gluconate additive of the invention is preferably comprised of gluconic acid, sodium gluconate, or other gluconate salts other than ferrous gluconate which is made in the invention, or combinations thereof. Such gluconate salts are environmentally friendly or environmentally acceptable, as is iron (II) gluconate made in the invention and effective as a sulfide scavenger. Gluconate salts also do not impair the properties of the drilling fluid to which it is added.

The iron source for use in the invention is preferably comprised of ferric oxide, ferrous oxide, ferric hydroxide, ferrous hydroxide, or combinations thereof. Such iron may be in solid or liquid form and if in liquid form, the preferred carrier fluid is aqueous.

The foregoing description of the invention is intended to be a description of preferred embodiments. Various changes in the details of the described composition and method can be made without departing from the intended scope of this invention as defined by the appended claims.

What is claimed is:

1. A method of removing hydrogen sulfide from a fluid containing hydrogen sulfide, the method comprising:
    adding a gluconate additive other than ferrous gluconate to the fluid, and adding a source of iron to the fluid where the fluid does not comprise iron or iron ions or where more iron is needed in sufficient quantity to react with the gluconate to form iron gluconate in the fluid;
    mixing the fluid such that the gluconate additive contacts the iron and forms iron gluconate in the fluid, wherein the fluid has a pH no lower than about 11 during the mixing; and
    allowing the iron gluconate in the fluid to react with the hydrogen sulfide in the fluid, forming iron sulfide, water and gluconic acid, such gluconic acid then being available to react with iron in the fluid to form iron gluconate.

2. The method of claim 1 further comprising maintaining the gluconate additive at a level to maintain a sulfide ion concentration in the fluid below a certain desired level.

3. The method of claim 1 wherein the quantity of gluconate additive and any iron source added to said fluid exceeds the quantity needed to form ferrous gluconate and react with all of the hydrogen sulfide in the fluid.

4. The method of claim 1 further comprising removing the iron sulfide from the fluid.

5. The method of claim 1 wherein the gluconate additive added to the fluid is selected from the group consisting of: gluconic acid; sodium gluconate; other gluconate salts other than ferrous gluconate; and combinations thereof.

6. The method of claim 1 wherein the iron source added to the fluid is selected from the group consisting of: ferric oxide; ferrous oxide; ferric hydroxide; ferrous hydroxide; and combinations thereof.

7. The method of claim 1 wherein the fluid is an aqueous fluid.

8. The method of claim 1 wherein the fluid is an oleaginous fluid.

9. The method of claim 1 wherein the fluid comprises at least one invert emulsion.

10. The method of claim 1 wherein the fluid comprises at least one emulsion.

11. The method of claim 1 wherein the fluid is a drilling fluid.

12. The method of claim 1 wherein the fluid is a well treatment fluid.

13. The method of claim 1 wherein the fluid is a well surface treatment fluid.

14. The method of claim 1 wherein the fluid is an effluent from an oil or gas well.

15. The method of claim 1 wherein the fluid is an effluent from a mining operation.

16. The method of claim 14 or claim 15 wherein the effluent comprises water.

17. The method of claim 1 wherein the fluid further comprises at least one polymer.

18. A method of reducing a concentration of hydrogen sulfide in a drilling fluid having a pH of at least about 11 and having a source of iron or iron ions, the method comprising:
   adding a gluconate additive other than ferrous gluconate to the fluid; and
   allowing the gluconate additive to react with the iron in the fluid with the fluid having a pH no lower than about 11 thereby forming iron gluconate in situ which reacts with the hydrogen sulfide in the fluid such that sulfide is precipitated.

19. The method of claim 18 wherein said sulfide is precipitated as iron sulfide.

20. The method of claim 18 wherein said drilling fluid has a pH ranging from about 11 to about 12.

* * * * *